Patented May 27, 1930

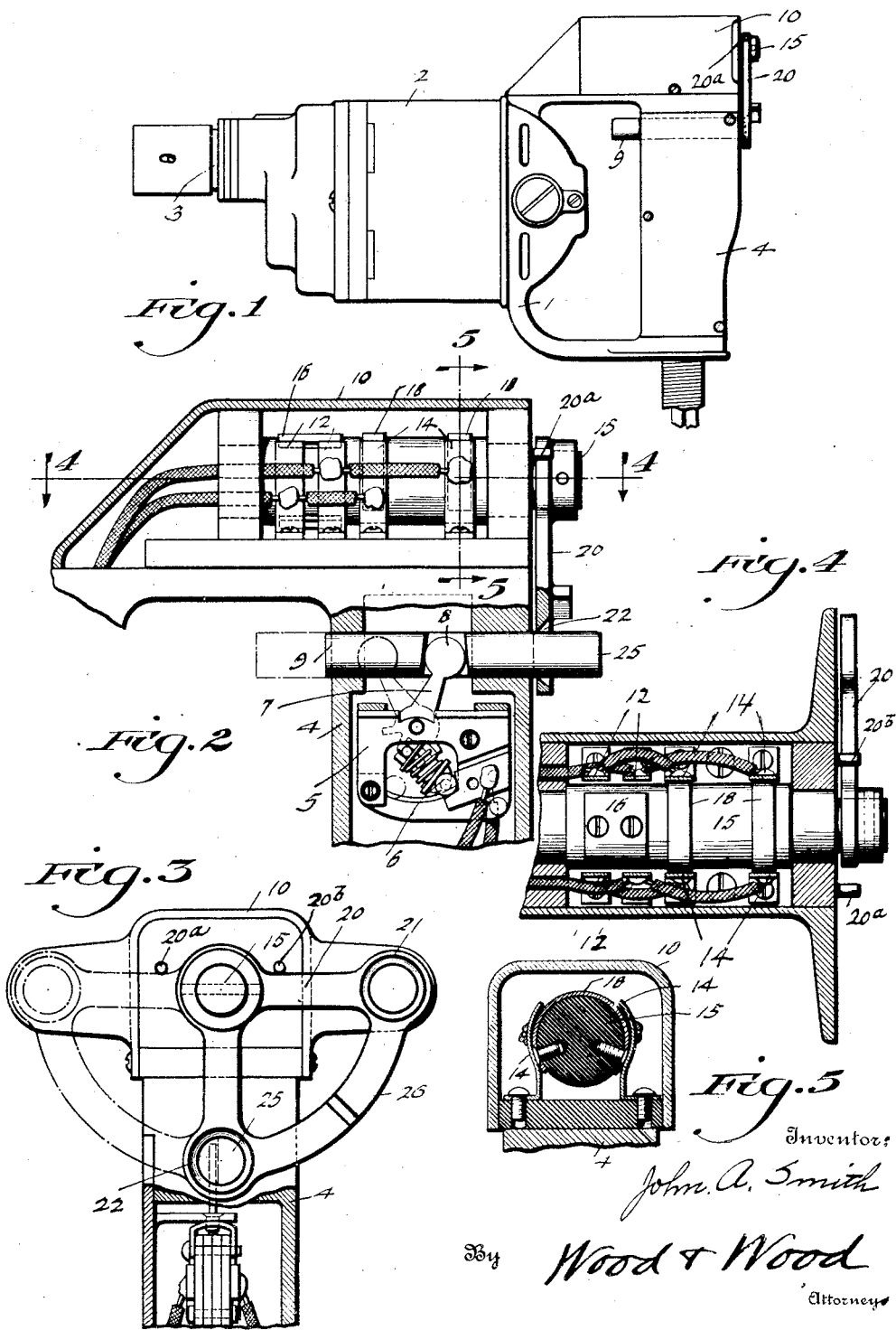

1,760,257

UNITED STATES PATENT OFFICE

JOHN A. SMITH, OF BELLEVUE, KENTUCKY, ASSIGNOR TO THE UNITED STATES ELECTRICAL TOOL COMPANY, OF CINCINNATI, OHIO, A CORPORATION OF OHIO

SWITCH

Application filed December 30, 1925. Serial No. 78,262.

This invention relates to electric switch and motor controlling mechanism primarily for motor driven hand tools, to prevent a motor reversing control without advancedly cutting off the power to the motor or reversely preventing a power control unless the motor or reversing control has been moved to its full controlling limits.

The device finds application in electric tools, and herein has been shown applied to an electric hand tool in which two switches are provided, one for controlling power to the motor, and the other for reversing control of the motor. In tools of this class it is desirable to prevent actuation of the reversing switch while the power is on, or in other words while the power controlling switch is closed.

The main feature of the invention resides in the provision of a switch having an oscillatable control element adapted for obtaining control action at opposite limits of motion, the control element of this switch being interlockingly engageable or interceptable by the controlling element as a reciprocating push button of a second control element of a second switch, to lock the first element at either of its control limits, and to prevent movement of the second control element when the first element is at an intermediate position.

Other objects and certain advantages will be more fully set forth in the description of the accompanying drawings forming a part of this specification, in which:

Figure 1 is a side elevation of an electric hand tool showing my invention applied thereto.

Figure 2 is a fragmentary detail vertical section showing the construction of the power snap switch, and of its interlocking relation with the control member of the reversing switch.

Figure 3 is an end view of the handle of the tool, showing the interlocked relation of the switch control members.

Figure 4 is a horizontal section on line 4—4 of Figure 2 through the reversing switch.

Figure 5 is a cross section on line 5—5 of Figure 2 also through the reversing switch.

The tool to which the invention is shown applied is designed as an electric motor driven hand tool, and comprises a handle 1, a casing 2 as a suitable mounting or housing for a motor. The spindle 3 is in suitable geared connection with the motor, the details of this structure not being shown herein. The tool is further provided with a hollow handle or grip portion 4 within which is mounted a power controlled switch 5 of the snap type. This switch comprises a spring contact member 6 having a slot therein engaged with a pin upon one arm of a lever 7 pivoted to the handle. The upper end of the lever is engaged in a notch 8 of the reciprocal switch control member 9 mounted crosswise of the grip portion. This control member in one of its switch control positions projects outwardly beyond the wall of the hollow handle, and in this instance this projecting position corresponds to a closed switch. The general structure of the switch is well known and therefore is not described in further detail.

Mounted upon the top of the handle within a suitable casing 10 is a reversing switch, comprising pairs of switch contacts 12, 14, eight in number, and suitably connected with motor and power switch, for electrical control. A rotatable shaft 15 is located between the contacts or fingers and said member has suitable insulated contact plates 16, 18, adapted to contact respective pairs of fingers alternately, as the member is rotated to switch controlling limits or positions. This control member is further provided with a segmental plate 20 as a quadrant having spaced openings 21, 22, therein concentric with its rotative axis, and in this instance lying at the extremity of right angularly related radii. This segment is adapted to be swung through angles of 90° to register either opening with the axis of reciprocation of the translatable member to permit the projecting end of this member to traverse an opening and lock the segment against rotation at either of its limits, or to impinge the segment when at intermediate positions and prevent closing of the power switch. In this instance the segment is adapted to be locked by the projecting end 25 of the translatable member of the power switch when this switch is closed, or, in other words, when the tool is operating. The rotative movement of the plate 22 is limited by stops 20ª, 20ᵇ, respectively to register openings 21, 22 with the end 25 of the translatable member.

Thus I provide a first switch having a control element movable to alternate switch control positions, and a second switch having a switch control element movable to a switch control position across the path of movement of the said first element, so that each element is adapted to intercept the control path of the other, such that the first element prevents control movement of the second when said first is at a position intermediate its control limits, and such that the second control element when in one control position prevents movement of the first element to a second switch control position.

The segment is of skeleton formation but provides a solid flat circular portion 26 extending between the two openings, and aligned with the axis of translation of the translatable member so that said member will impinge the segment to prevent its translation when the segment is at an intermediate position. This impingement or intercepting relation between the rotary switch control element and the translatable switch control element, is such that the translation of the latter element for closing the switch is prevented unless the rotary element is at one of its switch controlling limits.

Although the invention is applied to a tool of a specific type, and is adapted for interlocking the switch control elements in one specific manner, it will be readily understood that the principles of the interlock may be applied between the switch controlling elements of switches adapted for controlling other circuits. For this reason the wiring connections between the power switch, motor and reversing switch are not herein shown.

Having described my invention, I claim:

1. A controlling mechanism for an electric motor, comprising, a direction control switch and a power control switch, a rotatable operating lever for said direction control switch, a translatable control member for said power control switch, said rotatable lever provided with apertures alignable with said translatable member and traversed thereby in motor starting position to lock the direction control lever against movement while the motor power is on.

2. A controlling mechanism for an electric motor, comprising a reversing switch, a power control switch, a segmental rotatable control lever for the reversing switch having spaced concentric openings therein, a translatable control lever for the power switch, said segmental reversing control lever moving across the path of movement of the translatable member and traversed thereby when the motor power is on to lock the reversing switch lever against movement.

3. A controlling mechanism for an electric motor, comprising, a reversing switch, a power control switch, a swinging lever for said reversing switch, a translatable control element for said power switch, said control element adapted to traverse said swinging lever for preventing movement thereof when the translatable control element is in closed power connecting position.

4. A controlling mechanism for a portable electric motor having a handle, comprising, a direction control switch and a power control switch mounted in said handle, a rotatable operable lever for said direction control switch and a translatable lever for said power control switch, said translatable control lever adapted to traverse apertures in said rotatable operating lever for preventing movement of said direction control switch.

5. A controlling mechanism for an electric motor, comprising, a rotatable direction control switch, a segmental operating lever for said rotatable switch having apertures formed in its outer corners, a power control switch, a translatable element for operating said power control switch, said apertures adapted to be registered with and traversed by said translatable element, stops adapted to limit swinging movement of the segmental lever in either direction of motor control and said stops also disposed to alternately align said apertures with said translatable element whereby the translatable element in a motor starting position is adapted to traverse an aperture and prevent movement of the direction control switch.

6. Switch mechanism, comprising, a direction switch and a power switch, control elements for said switches moving in transverse and intersecting paths relative to each other, a locking member carried by the control element for the power switch, and two locking members carried by the control element for the direction switch, said last mentioned locking members adapted to cooperate with the first mentioned locking member so that the power switch in on position locks the direction switch in either forward or reverse position.

In witness whereof, I hereunto subscribe my name.

JOHN A. SMITH.